United States Patent [19]

Smith

[11] 4,173,098
[45] Nov. 6, 1979

[54] PLANTER

[76] Inventor: Elmer L. Smith, 6090 Cedarwood Rd., Mentor-on-the-Lake, Ohio 44060

[21] Appl. No.: 801,530

[22] Filed: May 31, 1977

[51] Int. Cl.² ............................................. A01G 27/00
[52] U.S. Cl. ............................................. 47/80; 47/84
[58] Field of Search ............ 47/79, 80, 81, 84, 62-64, 47/66

[56] References Cited

U.S. PATENT DOCUMENTS

| 132,178 | 10/1872 | Pugh | 47/79 |
|---|---|---|---|
| 1,108,334 | 8/1914 | Carr | 47/80 |
| 1,988,886 | 1/1935 | Wilson | 47/84 |
| 1,992,878 | 2/1935 | Muller | 47/80 |
| 2,698,500 | 1/1955 | Clegg | 47/84 X |
| 3,188,771 | 6/1965 | Ballai | 47/81 X |
| 3,334,440 | 8/1967 | Choquette | 47/79 |
| 3,739,523 | 6/1973 | Tuffli | 47/81 |

FOREIGN PATENT DOCUMENTS

| 86096 | 10/1965 | France | 47/79 |
|---|---|---|---|
| 6711673 | 2/1968 | Netherlands | 47/79 |

*Primary Examiner*—E. H. Eickholt
*Attorney, Agent, or Firm*—J. H. Slough

[57] ABSTRACT

A receptacle having an imperforate bottom has a perforated, horizontal wall spaced upwardly from the bottom and dividing the receptacle into upper and lower compartments. Tubes project through the perforated wall and extend upwardly above the upper edge of the receptacle and downwardly to the bottom of said receptacle. Lower end portions of the tubes below the horizontal wall are also perforated. The upper compartment is adapted to receive soil and the lower compartment receives excess water which evaporates through the tubes and keeps the soil moist.

7 Claims, 5 Drawing Figures

U.S. Patent
Nov. 6, 1979
4,173,098
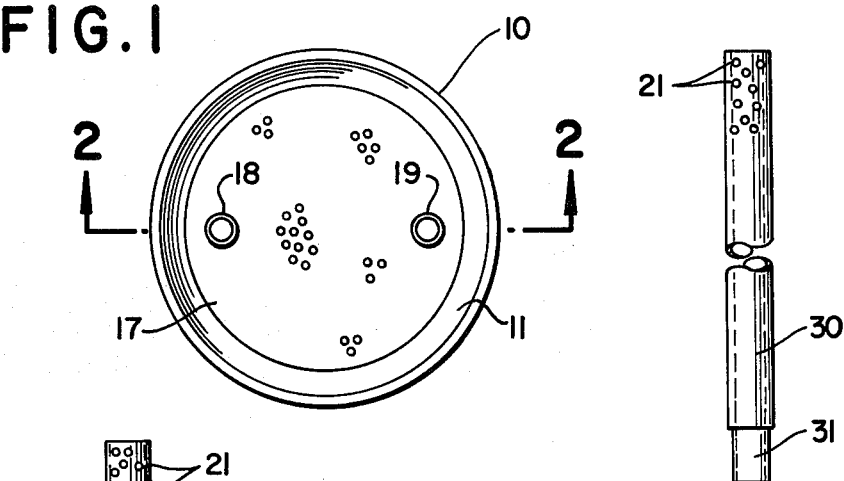
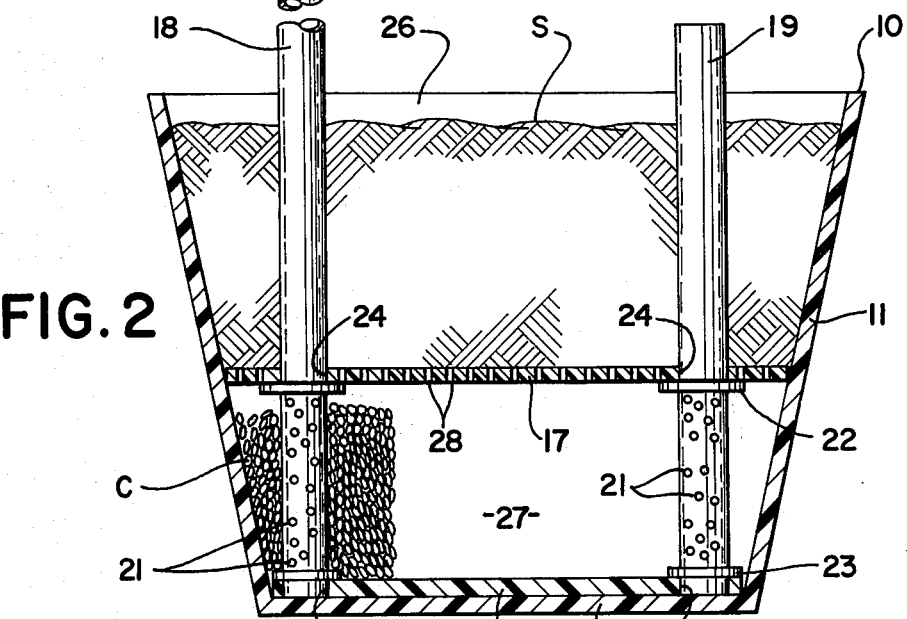
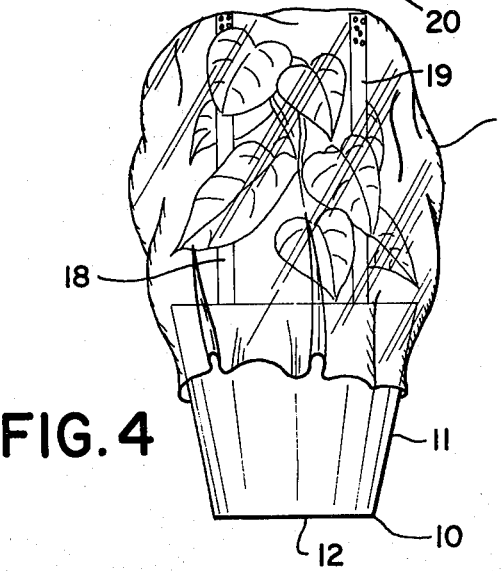
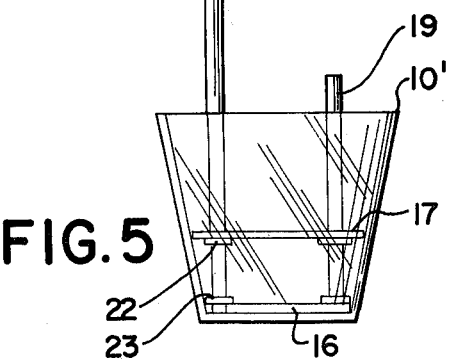

PLANTER

This invention refers to planters and particularly to a planter having a drainage compartment or space disposed beneath the soil and which may further include means for supporting a plant and/or a transparent cover for the plant. Planters of this type are known wherein a bottom compartment is provided for receiving excess water and disposing of the same or wherein the compartment is used to contain water or liquid fertilizer, the liquid creating a damp atmosphere beneath the soil and tending to keep it moist. It is also known to provide upwardly projecting support means mounted inside a planter. Prior planter or flower pot constructions having one or more of the above features are shown in various U.S. Pat. Nos., namely, 165,000 issued to J. S. Johnson June 29, 1875; 1,570,841 issued to W. Karnatz Jan. 26, 1926; 2,331,397 issued to H. H. Hummel Oct. 12, 1943; 2,404,370 issued to W. Fowlkes July 23, 1946; and 3,165,863 issued to J. Duran Jan. 19, 1965.

The present invention as herein disclosed comprises an upwardly open receptacle having a removable soil supporting insert structure including a horizontally disposed, perforated wall adapted to be disposed a substantial distance above the bottom of the receptacle and tube means projecting through the perforated wall and extending upwardly and downwardly therefrom. The horizontal wall divides the receptacle into upper and lower compartments, and the portion of the tube means disposed within the lower compartment is perforated whereby ambient air can circulate into the lower compartment. The upper compartment is adapted to contain soil, and the lower compartment is adapted to receive excess water from the upper compartment. The perforated tubes afford means for evaporation of the excess water and the circulation of ambient air beneath the soil for the purpose of aeration. An additional feature herein disclosed comprises extending the tube means upwardly a substantial distance above the receptacle to serve as a plant support or a support for a transparent plant cover. Perforations are provided in the upper end portion of the tube means whereby a moist atmosphere caused by evaporation in the lower compartment is provided within the transparent cover.

The present invention also contemplates providing a planter insert structure which is adapted to be assembled and inserted into a suitable receptacle, and which can be removed and dismantled if desired.

The general object of this invention is to provide an improved planter creating ideal growing conditions for potted plants.

Another object of this invention is to provide a planter of the type referred to which eliminates the need for draining off excess water applied to the soil.

Still another object of the invention is to provide a planter of the above type wherein means are provided for both aerating and moisturizing the plant soil from below.

A still further object of this invention is to provide a planter which can remain unattended for long periods of time without damage to the plant.

Yet another object of the invention is to provide a planter having the above features and characteristics wherein a portion of the aerating means can also serve as a plant support.

Yet another object of this invention is to provide a planter of the type referred to comprising easily assembled parts which simplify packing, shipping, and merchandising of the planter or dismantling and cleaning thereof.

A further object of the invention is to provide an easily assembled and dismantled planter insert structure for a plant receptacle.

Another object of this invention is to provide a planter as characterized above adapted to receive a transparent cover to create a greenhouse effect and having means for maintaining a moist atmosphere within the cover.

Yet another object of this invention is to provide such a planter whereby the user can visually determine the amount of water in the lower compartment.

Other objects of the invention and the invention itself will become readily apparent from the following specification and reference to the accompanying drawings, in which said drawings:

FIG. 1 is a top plan view of the planter of this invention;

FIG. 2 is an enlarged section taken along the line 2—2 of FIG. 1 showing the planter with soil disposed therein;

FIG. 3 is a detail view of a tubular extension for the planter;

FIG. 4 is a side elevation on a reduced scale of the planter showing the same supporting a transparent cover; and FIG. 5 is a side elevation of a modified planter drawn to the scale of FIG. 4.

Referring now to the drawings in all of which like parts are designated by like reference numerals, the planter of this invention comprises an upwardly opened receptacle 10 which may be of any suitable shape and is herein disclosed as being of inverted frustoconical form. Said receptacle comprises a circumferentially continuous, upwardly diverging side wall 11 and an imperforate bottom wall 12.

The receptacle 10 is adapted to receive an insert structure, generally indicated at 13, which comprises a bottom support disc 16, an upwardly spaced horizontal wall 17, and a plurality of tubular members 18 and 19. Although the invention as herein illustrated discloses two such tubular members, it will be understood that any suitable number may be used depending upon the size and capacity of the planter and the kind of plant to be grown. All of the planter parts are ideally constructed of a suitable plastic which is waterproof and characterized by substantial rigidity.

The bottom support disc 16 is disposed flatwise against the imperforate bottom wall 12 and is provided with a pair of apertures 20 disposed adjacent to the periphery of the disc, said apertures being of such size as to slidably receive the lower ends of the tubular members 18 and 19. Said tubular members project upwardly through suitable apertures 24 in the horizontal wall 17, said apertures 24 slidably receiving said tubular members.

In the form of the invention shown in FIG. 2, the tubular member 18, part of which is shown broken away, preferably projects a substantial distance above the upper edge of the receptacle 10. The lower end portion of the tubular member 18 is provided with a plurality of small perforations 21 in the area thereof disposed between the horizontal wall 17 and the imperforate bottom wall 12. An upper end portion of said tubular member 18 is also provided with a plurality of perforations 21, the intermediate portion of said member comprising an imperforate cylindrical wall. The lower end portion of the tubular member 18 is also provided with upper and lower support rings 22 and 23, respectively, which are integral with or securely fastened to said tubular member. The support rings 22 and 23 are disposed against the bottom of the wall 17 and the top of the support disc 16, respectively, whereby to space said wall 17 a predetermined distance above the bottom wall 12 of the receptacle and to stabilize the insert structure 13.

The tubular member 19 is similar in construction to the tubular member 18 and is similarly provided with perforations 21 and support rings 22 and 23 adjacent to the bottom end thereof below the wall 17. In the form of the invention herein illustrated, the upper end of the tubular member 19 terminates only a short distance above the upper edge of the receptacle 10.

The wall 17 divides the receptacle 10 into an upper compartment 26 and a lower 27. Said wall 17 is provided with a multiplicity of small perforations 28 whereby water and air can circulate between said upper and lower compartments.

The perforated wall 17 is adapted to closely but not tightly interfit the frustoconical side wall 11 at the level at which it is disposed. The perforations 28, although large enough to freely allow the circulation of air and water, are small enough to prevent any substantial amount of soil from passing therethrough. Thus the upper compartment 26 is adapted to receive planting soil S which surrounds nonperforated portions of the tubular members 18 and 19 and which does not extend above the upper end of either of said members. When the plant is watered, excess water drains through the perforations 28 and accumulates in the lower compartment 27. The water can freely enter the tubular members 18 and 19 in a radial direction through the perforations 21 in the lower end portions thereof. Said tubular members are open at the top to allow evaporation of the water in the lower compartment 27. Under usual conditions, said lower compartment will have some water disposed therein but will also afford an air space having a humid atmosphere which will serve to keep the soil adjacent to the roots of the plant moist and ideal for growing conditions. At the same time, ambient air may freely circulate through the tubular spacer members 18 and 19 beneath the soil whereby said soil is aerated.

Water in the lower compartment 27 tends to keep the soil above it moist for a longer period of time than ordinary watering with conventional flower pots. Thus if the owner is going to be away for an extended period and cannot water the plant, the lower compartment 27 can be filled and the plant will have adequate moisture even when left unattended. It will be readily understood that the length of time which a plant could go without rewatering would depend upon variable factors such as the size of the planter in relation to the size of the plant, the size of the bottom compartment 27, and the type of plant used, as will be readily understood by any horticulturist.

The basic planter of this invention as hereinabove described is subject to certain modifications and adaptations. For example, charcoal granules C can be placed in the lower compartment 27 to absorb any unpleasant soil odor that might escape through the tubular members 18 and 19. The longer tubular member 18, in addition to comprising part of the evaporation system, can also provide means for supporting a large plant which can be tied or otherwise attached thereto.

In some instances, it may be desirable to have two elongated tubes for the purpose of more adequately supporting a plastic cover over a growing plant. FIG. 3 illustrates an extension 30 the lower end of which has a circumferentially reduced shank 31 adapted to be inserted in the upper end of the tubular member 19. Thus the tubular member 19 can be extended to the height of the tubular member 18 whereby said tubular members can be used to support a transparent cover 32. The cover 32 is preferably made of flexible plastic which can be drawn around the upper end of the receptacle 10 or tucked inwardly under the plant thereby creating an individual greenhouse effect for the plant. The upper end of the extension 30, like the upper end of the tubular member 18, is also provided with perforations 21. Thus, the damp air from the lower compartment 27 can circulate into the "greenhouse" thereby providing a moist atmosphere caused by the evaporation of the water through the hollow tubes.

It will be readily seen that the present invention makes it possible for the horticulturist to provide sustained and prolonged watering of the plant and also allows him to create exactly the ideal atmosphere and growing conditions for any given flower or the like. If the greenhouse effect is provided, the user may leave an opening in the plastic cover for misting or watering. Trays or reservoirs beneath the receptacle are completely unnecessary, and the lower compartment 27 does not need to be emptied. FIG. 5 illustrates a planter of the present invention wherein the receptacle 10 is transparent glass or plastic thereby allowing the user to see exactly how much water is collecting in the lower compartment 27.

It will be understood that many changes in the details of the invention as herein described and illustrated may be made without, however, departing from the spirit thereof or the scope of the appended claims.

I claim:

1. A planter comprising a receptacle open at the top and having an imperforate bottom wall;
   a removable insert structure for said receptacle, said structure comprising a flat bottom support member disposed on said bottom wall, said support member having a plurality of sockets spaced outwardly from the center thereof;
   a horizontal wall disposed within said receptacle above said bottom support member and dividing said receptacle into upper and lower compartments, said horizontal wall having a plurality of apertures aligned with said sockets;
   a pair of tubular members each having a pair of radially outwardly projecting support rings spaced axially along said tubular member, a lower end portion of each said tubular member being disposed in one of said sockets and one of said support rings abutting the top of said bottom support member, each said tubular member projecting upwardly through one of said apertures and above said horizontal wall, the other of said support rings being disposed below and supporting said horizontal wall;
   said horizontal wall being perforated to allow air and water to pass therethrough while retaining soil in said upper compartment;
   the lower end portion of each said tubular member which is disposed within said lower compartment being perforated to allow air and water to pass radially therethrough;

said upper compartment adapted to hold soil to a level below the upper ends of said tubular members whereby when excess water from said soil passes through said perforated horizontal wall and collects in said lower compartment, said tubular members provide means for air circulation and evaporation within said lower compartment, and said perforated wall portion provides means for humid air to aerate said soil and keep it moist.

2. A planter as set forth in claim 1 wherein charcoal granules are disposed in said lower compartment to absorb soil odor.

3. A planter as set forth in claim 1 wherein one of said tubular members extends upwardly a substantial distance above the soil level and provides support means for a plant.

4. A planter as set forth in claim 3 wherein the upper end portion of said tubular member is perforated to allow air to pass radially therethrough;

said tubular member adapted to support a transparent flexible cover which encases the plant and provides a moist atmosphere resulting from evaporation of water through said tubular member.

5. A planter as set forth in claim 4 wherein the other said tubular member extends upwardly a relatively short distance above the soil level;

a tubular extension having a diametrically reduced, hollow shank portion insertable into the upper end of said other tubular member to extend the effective height thereof to substantially the level of said one spacer member;

the upper end portion of said tubular extension being perforated to allow air to pass radially therethrough.

6. A removable planter insert structure for a receptacle open at the top and having an imperforate bottom, said insert structure comprising a flat bottom support member having a plurality of sockets spaced outwardly from the center thereof;

a wall member having a plurality of apertures therein of substantially the same size as and adapted to align with said sockets;

said wall member being perforated sufficiently to allow air and water to pass therethrough while substantially retaining soil;

a pair of tubular members having a cross section such as to slidably interfit said sockets and said apertures;

each said tubular member having a pair of axially spaced, radially outwardly projecting spacer rings, one end portion of said tubular member projecting beyond one of said rings only sufficiently to engage one of said sockets, the other of said rings being spaced a substantial distance from said one end portion and a substantial distance inwardly from the opposite end portion of said tubular member;

each said tubular member being perforated in the area between said spacer rings, to allow air and water to pass radially therethrough;

said insert structure adapted to be assembled by projecting said one end portion of each tubular member into a socket until said one ring abuts said bottom support, and projecting the upper end portion of each said tubular member through an aperture in said wall member until said wall member seats upon said other ring, the entire assembly being insertable into said receptacle whereby said wall member divides the receptacle into an upper compartment for holding soil and a lower compartment for receiving excess water and evaporating the same through said tubular members.

7. A planter insert structure as set forth in claim 6 including a tubular extension having a diametrically reduced, hollow shank portion insertable into the upper end of one of said tubular members to extend the effective height thereof and provide support for a plant.

* * * * *